US008879108B2

(12) United States Patent
Tamura

(10) Patent No.: US 8,879,108 B2
(45) Date of Patent: Nov. 4, 2014

(54) APPARATUS FOR REGISTERING DOCUMENTS IN A DOCUMENT MANAGEMENT SERVER

(75) Inventor: Makiya Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 782 days.

(21) Appl. No.: 12/606,785

(22) Filed: Oct. 27, 2009

(65) Prior Publication Data

US 2010/0115517 A1 May 6, 2010

(30) Foreign Application Priority Data

Oct. 31, 2008 (JP) .................................. 2008-281866

(51) Int. Cl.
*G06K 15/00* (2006.01)
*H04N 1/00* (2006.01)
*G06F 17/30* (2006.01)

(52) U.S. Cl.
CPC ....... *H04N 1/00209* (2013.01); *H04N 1/00217* (2013.01); *G06F 17/30011* (2013.01); *H04N 1/00225* (2013.01); *H04N 2201/0094* (2013.01); *H04N 2201/0081* (2013.01); *H04N 1/00244* (2013.01)
USPC ......... 358/1.16; 358/403; 705/342; 705/7.26; 715/780

(58) Field of Classification Search
USPC ................... 235/379; 358/403, 474; 382/100; 700/83; 705/14.11, 28, 342, 4, 7.26; 707/805; 709/206; 715/234, 780
See application file for complete search history.

(56) References Cited

U.S. PATENT DOCUMENTS

| | | | | |
|---|---|---|---|---|
| 6,208,339 B1* | 3/2001 | Atlas et al. | ..................... | 715/780 |
| 6,553,336 B1* | 4/2003 | Johnson et al. | ............... | 702/188 |
| 2002/0055942 A1* | 5/2002 | Reynolds | ....................... | 707/200 |
| 2004/0010557 A1* | 1/2004 | Chapman et al. | ............. | 709/206 |
| 2004/0128182 A1* | 7/2004 | Pepoon et al. | .................... | 705/9 |
| 2006/0004746 A1* | 1/2006 | Angus et al. | ...................... | 707/4 |
| 2006/0031211 A1* | 2/2006 | Mizuno | ............................. | 707/3 |
| 2006/0206814 A1* | 9/2006 | Tonomura et al. | ............. | 715/530 |
| 2006/0265242 A1 | 11/2006 | Kashioka | | |
| 2007/0022027 A1* | 1/2007 | Gupta et al. | .................... | 705/35 |
| 2007/0185885 A1* | 8/2007 | Tamura | ........................... | 707/10 |
| 2008/0030800 A1* | 2/2008 | Matsukawa et al. | .......... | 358/474 |
| 2008/0231909 A1* | 9/2008 | Nakamura et al. | ............ | 358/403 |

FOREIGN PATENT DOCUMENTS

| | | | |
|---|---|---|---|
| JP | 2002-074247 A | | 3/2002 |
| JP | 2004-362385 A | | 12/2004 |
| JP | 2005-173878 A | | 6/2005 |
| JP | 2005-301733A A | | 10/2005 |
| JP | 2006-325146 A | | 11/2006 |
| JP | 2007035070 A | * | 2/2007 |

OTHER PUBLICATIONS

Research Disclosure 316043 (Aug. 1990).*

* cited by examiner

*Primary Examiner* — David S Cammack
(74) *Attorney, Agent, or Firm* — Canon USA Inc IP Division

(57) ABSTRACT

A method for controlling a document processing apparatus which registers input document data in a document management server includes acquiring, from the document management server, information about input items necessary for registration of the document data into the document management server, determining whether each of the input items necessary for the registration of the document data are input, based on the acquired information, and performing control to complete the registration of the document data into the document management server when it is determined that the input items are input, while to temporarily register the document data into the document management server when it is determined that at least one of the input items is not input.

21 Claims, 15 Drawing Sheets

APPARATUS FOR REGISTERING DOCUMENTS IN A DOCUMENT MANAGEMENT SERVER

BACKGROUND OF THE INVENTION

1. Field of the Invention

The present invention relates to a technique in which document data is managed by a document management server.

2. Description of the Related Art

Recently, a sever system has been known which realizes a service referred to as a document management system. The document management system can organize a large amount of images and documents in an office and store them in a database to facilitate a search and management of the images and the documents.

One reason why the above system was introduced is, for example, that in the office in which information is transferred in a paper medium, an amount of the information is increasing and therefore it is troublesome for a user to search and specify desired information among a large amount of the paper media. Further, if the information is printed on the paper medium, it is difficult to share a single document between many users.

Recently, an image processing apparatus which has a function of scanning, reading and computerizing an image on a paper medium, has come to have also a network communication function. As a result, the image processing apparatus can connect to a network such as a local area network (LAN). Accordingly, the image processing apparatus can directly or indirectly scan a document and computerize the scanned document into image data, and transmit the computerized image data to a document management system via the network.

Japanese Patent Application Laid-Open No. 2006-325146 discusses a technique for registering a scanned document in a designated server.

In the document management system, when computerized document data is registered and stored, a document name, a comment, index information for searching and organizing the document data, and the like can be registered as document property information in association with the document data. Further, the document property information includes an essential input item according to a way of management and use of the document management system in a user environment.

On the other hand, there is a limit in an operability of the image processing apparatus. For example, most of operation panels installed in the apparatus include small displays which can be used as a graphical user interface (GUI). Further, for example, an interface such as a keyboard for a personal computer (PC), which can easily input a character string, is not always connected to the image processing apparatus. Consequently, a user cannot always appropriately input all the values of the essential input items in registering the document data into the document management system from the image processing apparatus when a document is scanned.

Therefore, if the values of the essential input items for the registration of the document data into the document management system cannot be acquired, transmission of the document data from the image processing apparatus to the document management system may fail due to an error at the document management system side. Consequently, document registration may be unsuccessful. Alternatively, the document data is registered as inappropriate document data, and the user cannot acquire the document data through a search.

Therefore, if the document registration cannot be made appropriately, the user is required to perform a cumbersome task that the user transmits the document data again after inputting the essential input items and scanning the document. In some cases, the user may not be aware that the document registration was made inappropriately.

The present invention relates to a technique for preventing incomplete input of the essential input items when document data is registered in the document management unit.

SUMMARY OF THE INVENTION

The present invention provides a document processing apparatus and a controlling method thereof, and a document management system and a data processing method for the system which overcomes the above-described problem.

According to an aspect of the present invention, a document processing apparatus which registers input document data in a document management server includes an acquiring unit configured to acquire, from the document management server, information about input items necessary for registration of the document data into the document management server, a determination unit configured to determine whether each of the input items necessary for the registration of the document data are input, based on the information acquired by the acquiring unit, and a control unit configured to perform control to complete the registration of the document data into the document management server when the determination unit determines that the input items are input, while to temporarily register the document data into the document management server when the determination unit determines that at least one of the input items is not input.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the attached drawings.

An exemplary embodiment for implementing the present invention will be described below in detail with reference to the attached drawings. However, the document management system and constitution elements thereof described in the present exemplary embodiments are mere examples, and therefore the scope of claims of the present invention would not be restricted by those exemplary embodiments. In other words, the present invention is applied not only for a limitative case of registration of document data obtained by scanning a document using a scanning function of the image processing apparatus but also a case of registration of various data, and can produce the same effect in both cases.

Examples of document data according to the present exemplary embodiment may include computerized data generated according to various methods, such as image data, text data, and file data. An item to be input such as an attribute of the document data is not limited to an item to be directly input by the user who instructs to scan the document but may be an item to be input by the other users (administrators or the like). Further, the item may include various changes and applications.

Figure 1:
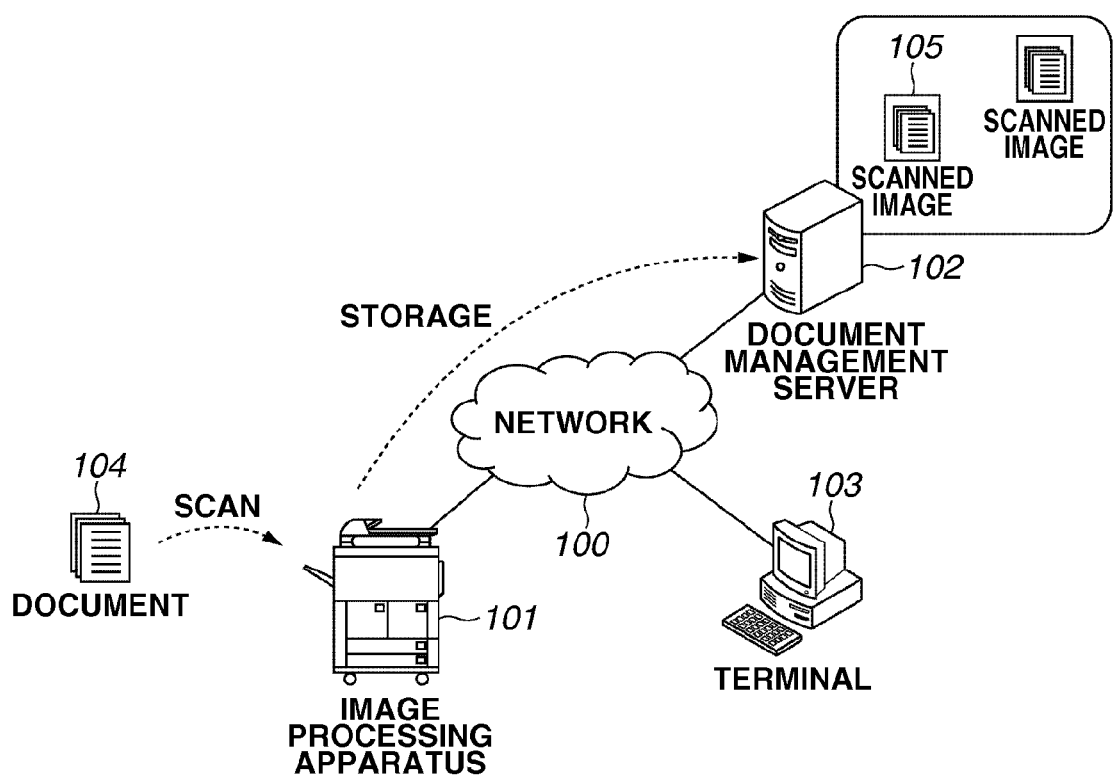
FIG. 1 illustrates a document management system according to an exemplary embodiment of the present invention.

FIG. 1 illustrates a document management system which is an example of a first exemplary embodiment of the present invention.

The system includes an image processing apparatus 101, a document management server 102, and a terminal 103 which are connected to each other via a network 100. The above described apparatuses work together to provide data processing. Apparatus included in the system is not limited to the above described ones, and the system may include other apparatus in addition to the above described ones. Alternatively, the apparatuses other than the document management server 102 may be omitted from the system.

The network 100 establishes communication between individual apparatus of the system, and may be a wired or wireless intranet or internet network system, or the other network system.

The image processing apparatus 101 has a function of reading (scanning) an image on a document 104 and generating image data by computerizing the image. The image processing apparatus 101 also includes a function of transmitting the generated image data or data received from the other apparatus to another apparatus via the network 100.

The document management server 102 can register and manage data received from the other apparatus (for example, scanned image 105 that the image processing apparatus 101 scanned) as document data, and has a function of searching the registered document data.

The document management server 102 accepts a request from the terminal 103 via the network 100, and executes processing such as registration, search or management of the document data according to the request. The data registered in the document management server 102 is referred to as the document data but there is no limitation of a format thereof. Thus, the data can be in various formats, such as image data, text data, application-dependent file data.

A function of the terminal 103 can be realized by a general personal computer (PC). The terminal 103 is installed with, for example, an operating system (OS), application software which can process document data and image data, and application software for transmitting/receiving data with the document management server 102.

Further, the terminal 103 includes a display for displaying various types of information and an input device such as a keyboard or a mouse which receives instructions from the user. The terminal 103 receives an instruction from the user and sends the document management server 102 a request for requesting processing of registration or search of the document data via the network 100.

The document management system may include more than one each of the image processing apparatuses 101, the document management servers 102, and the terminals 103 illustrated in FIG. 1.

Figure 2:
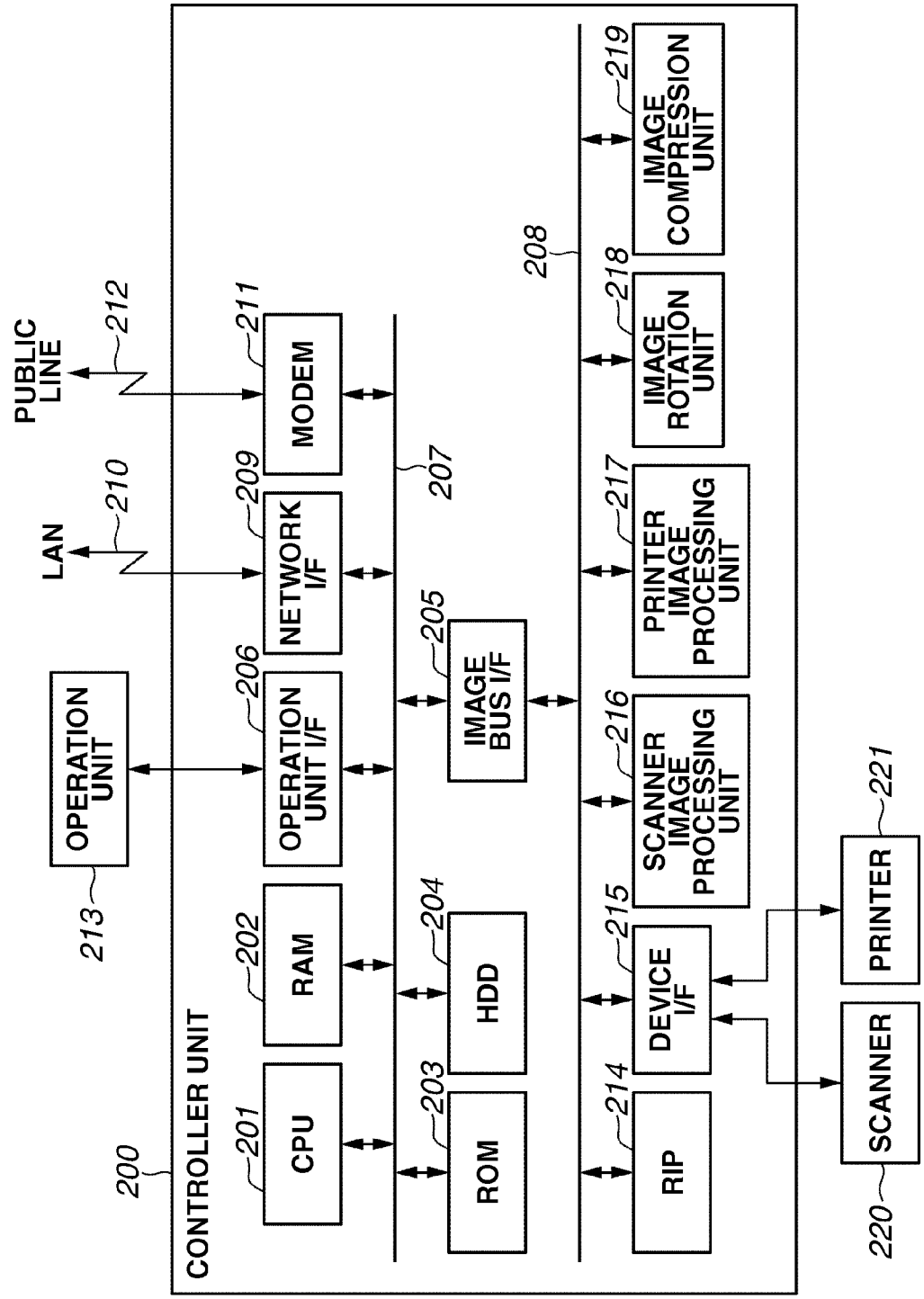
FIG. 2 is a block diagram illustrating an example of a configuration of an image processing and forming apparatus.

FIG. 2 is a block diagram illustrating an example of a configuration of the image processing apparatus 101 illustrated in FIG. 1.

In FIG. 2, a controller unit 200 performs processing of data managed by the image processing apparatus 101. The controller unit 200 is connected to a scanner 220 as an image input device and a printer 221 as an image output device as well as an operation unit 213.

The controller unit 200 performs control to realize a copying function of outputting, by the printer 221, image data obtained by reading an image on a document by the scanner 220. The controller unit 200 is connected to a LAN 210 or a public line 212 to perform control for realizing a transmission/reception function of the image data via the network 100 or the public network and control for inputting and outputting various pieces of information.

A central processing unit (CPU) 201 performs control of entire processing of the image processing apparatus 101. The CPU 201 is connected to a random access memory (RAM) 202, a read-only memory (ROM) 203, and a hard-disk drive (HDD) 204 via a system bus 207. The CPU 201 is also connected to an image bus interface (I/F) 205 and an operation unit interface (I/F) 206. In addition, the CPU 201 is connected to a network interface (I/F) 209 and a modem 211.

The CPU 201 starts an operation system (OS) by a boot program stored in the ROM 203. The CPU 201 executes an application program stored in the HDD 204 on the OS to execute various processing.

At the time, the CPU 201 uses the RAM 202 as a work area. The RAM 202 is used as the work area of the CPU 201 and also used as an image memory area for temporarily storing image data. The HDD 204 stores the application program and image data which is used by the application program.

The image bus I/F 205 is a bus bridge which connects the system bus 207 and an image bus 208 and converts a data format.

The operation unit I/F 206 interfaces with the operation unit 213 which includes a touch panel. The CPU 201 outputs image data of an image to be displayed on the operation unit 213 to the operation unit 213 via the operation unit I/F 206. The operation unit 213 transmits information input by the user to the CPU 201 via the operation unit I/F 206.

The system bus 207 serves as a transmission bus which provides a connection between elements (an address bus, a data bus, an input/output bus, and a control bus).

The image bus 208 provides a high speed transmission of image data and includes a peripheral component interconnect (PCI) bus or an Institute of Electrical and Electronic Engineers (IEEE) 1394 bus.

The image bus 208 is connected to a raster image processor (RIP) 214, a scanner image processing unit 216, a printer image processing unit 217, an image rotation unit 218 and an image compression unit 219. Further, the image bus 208 is also connected to a device interface (I/F) 215. Thus, the image bus 208 can serve as a connection interface with the scanner 220 and the printer 221.

The network I/F 209 is connected to the LAN 210 (network 100) to perform transmission and reception of information to and from each apparatus connected to the LAN 210 via the LAN 210.

The modem 211 is connected to the public line 212 (public switched telephone networks (PSTN)) and transmits and receives information via the public line 212.

The RIP 214 rasterizes a received page description language (PDL) code into a bit map image.

The device I/F 215 serves as a connection interface with the scanner 220 and the printer 221, and performs synchronous system/asynchronous conversion processing of image data.

The scanner image processing unit 216 corrects, processes, and edits the image data input from the scanner 220. Further, the scanner image processing unit 216 outputs the image data, that is corrected, processed and edited, into the printer image processing unit 217, the image rotation unit 218, the image compression unit 219, or the HDD 204 according to an instruction input by the operation unit 213.

The printer image processing unit 217 performs processing such as correction and resolution conversion according to a characteristic of the printer 221 to a print output-image data to be output to the printer 221. Further, the printer image processing unit 217 outputs the image data obtained as a result of the processing, such as the correction and the resolution conversion, to the printer 221 according to the instruction input from the operation unit 213.

The image rotation unit 218 rotates the input image data.

The image compression unit 219 compresses multi-valued image data into Joint Photographic Experts Group (JPEG) data, and binary image data to data in Joint Bi-level Image Experts Group (JBIG), modified modified Read (MMR), or modified Huffman (MH). The image compression unit 219 also decompresses thus compressed data.

The scanner 220 photoelectrically reads (scans) a document image by a charge coupled device (CCD) linear image sensor or the like according to a scanning instruction input from the operation unit 213 to convert the document image into digital image data. The converted digital image data is output to the scanner image processing unit 216.

The printer 221 includes a plurality of types of recording sheet cassettes and visually outputs the image data output from the printer image processing unit 217 on a recording sheet according to a printing instruction input from the operation unit 213 or upon reception of image data from an external device.

Figure 3:
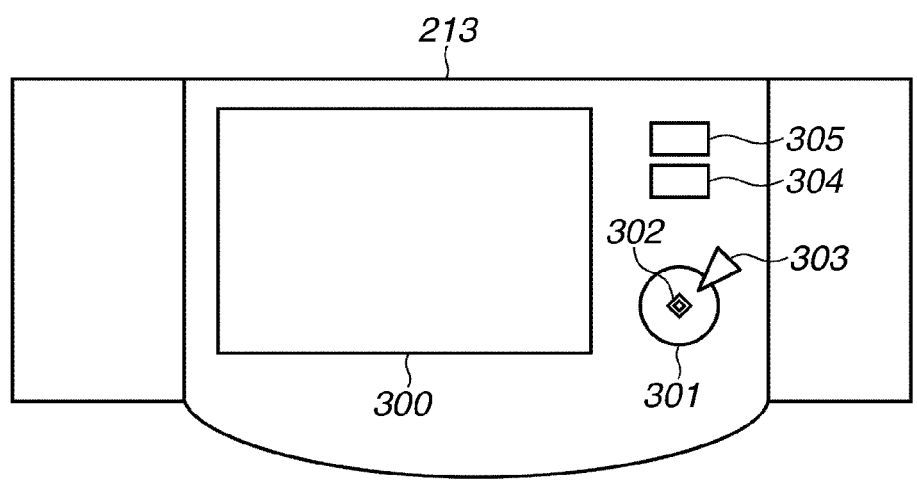
FIG. 3 illustrates an example of a configuration of an operation unit.

FIG. 3 illustrates an example of a configuration of the operation unit 213 illustrated in FIG. 2.

A liquid crystal display (LCD) unit 300 is configured to be provided with a touch panel sheet on an LCD and displays an operation screen of the image processing apparatus 101. When a user presses a key displayed on the operation screen, the LCD unit 300 notifies the CPU 201 of the controller unit 200 of positional information about the pressed key. The CPU 201 executes processing according to the pressed key and transits a screen to another screen.

A start key 301 starts various processing when the user presses the start key 301. When the user presses the start key 301, the start key 301 notifies the CPU 201 of a message to this effect. The CPU 201 starts causing the scanner 220 to read, transmit and print the document image upon receiving the notification from the start key 301.

A center of the start key 301 is provided with two-color light-emitting diode (LED)s 302, i.e., a green LED and a red LED. The start key 301 controls emission colors of the two-color LEDs 302 according to an instruction from the CPU 201 and indicates the user whether the user can press the start key 301 according to the emission colors.

The stop key 303 is configured to stop running of processing and notify the CPU 201 of information that the stop key 303 is pressed when the user presses the stop key 303. The CPU 201 stops the running processing and operation when the CPU 201 receives the notification from the stop key 303.

An identification (ID) key 304 is configured to receive input of ID for specifying the user who is operating the image processing apparatus 101. When the user presses the ID key 304, the ID key 304 notifies the CPU 201 of information to this effect. The CPU 201 displays a screen which causes the user to input the user ID on the LCD unit 300 upon receiving the notification from the ID key 304. Then, the user inputs the user ID by using a numeric keypad or the like. A mail address of the user may be stored in the RAM 202 or the HDD 204 by associating with the user ID, and used for sending various notifications by an electronic mail.

A reset key 305 returns the information input by the user to an initial condition. When the user pressed the reset key 305, the reset key 305 notifies the CPU 201 of information to this effect. The CPU 201 initializes a setting displayed on the LCD unit 300 upon receiving the notification from the reset key 305.

Figure 4:
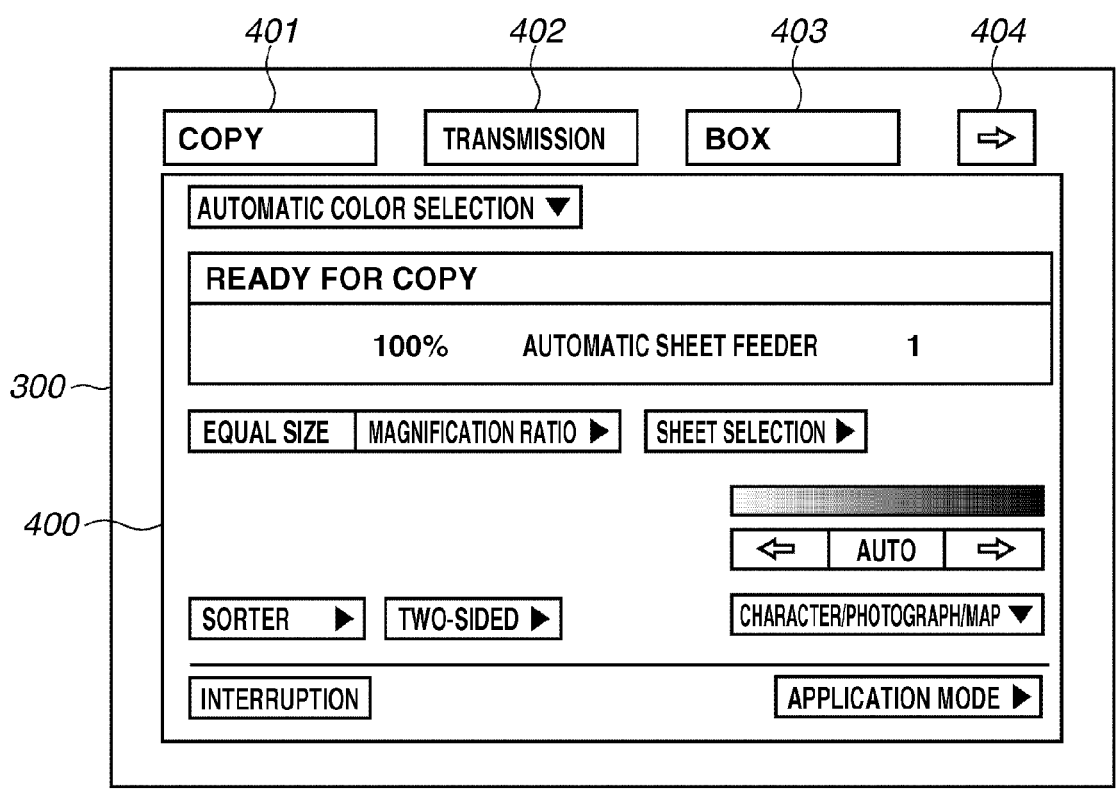
FIG. 4 illustrates an example of an operation screen displayed on the operation unit.

FIG. 4 illustrates an example of an operation screen displayed on the LCD unit 300 of the operation unit 213.

An upper portion of the operation screen is provided with a copy tab 401, a transmission tab 402, a box tab 403, and a rightward tab 404 which are touch keys for selecting a function among various functions.

FIG. 4 illustrates an initial screen of a copying function when a touch key of the copy tab 401 is pressed. The copying function is displayed on an area 400. An indication of "READY FOR COPY" represents a present status of the copying function that the image processing apparatus 101 is standby for a copying instruction. The status changes according to a condition of the image processing apparatus 101.

A lower area of the area 400 in which the status of the image processing apparatus 101 is displayed is provided with displays of a copy ratio (100%), a sheet cassette to be used (automatic sheet feeder), a number of copies to be printed (1) which are presently set.

Further, a "EQUAL SIZE" key, a "MAGNIFICATION RATIO" key and a "SHEET SELECTION" key are displayed on the screen as touch keys for setting an operation mode of the copying function according to the instruction of the user. Similarly, a "SORTER" key, a "TWO-SIDED" key, an "INTERRUPTION" key, a "CHARACTER" key, a "left arrow" key for lightening color density", a "right arrow" key for darkening the color density, and an "AUTO" key for automatically adjusting the color density are displayed on the screen as touch keys for setting the operation mode of the copying function.

Other setting screens of the operation mode which cannot be included in the initial screen can be displayed in a hierarchical manner within the area 400 when an "APPLICATION MODE" key is pressed.

When the user presses the transmission tab 402, a color of the transmission tab 402 changes. The area 400 is switched to an operation screen for receiving an operation for the transmission function.

In the transmission function, image data obtained by reading an image on a document using the scanner 220 or image data stored in the HDD 204 can be transmitted to an apparatus on the LAN 210 by an electronic mail or a file transfer protocol (FTP). Further, it is possible to transmit the image data by a facsimile using the public line 212. In the transmission function, designation of a transmission destination of the image data, setting of the scanner 220 to read a document to be sent, and a selection of the image data to be sent from the HDD 204 can be performed.

When the user presses the box tab 403, a color of the box tab 403 changes. The area 400 is switched to an operation screen for receiving an operation for a box function.

In the box function, image data obtained by reading an image on a document using the scanner 220 can be stored in the HDD 204, or the image data stored in the HDD 204 can be selectively output. Examples of an outputting method include printing by the printer 221 and transmission according to the transmission function. As for the box, a plurality of users can use the box individually by dividing the HDD 204 into a plurality of areas.

When more than three functions are installed on the controller unit 200, an arrow key 404 is displayed in addition to the tabs 401 through 403. When the user presses the arrow key 404, a screen for indicating other functions is displayed.

Figure 5:
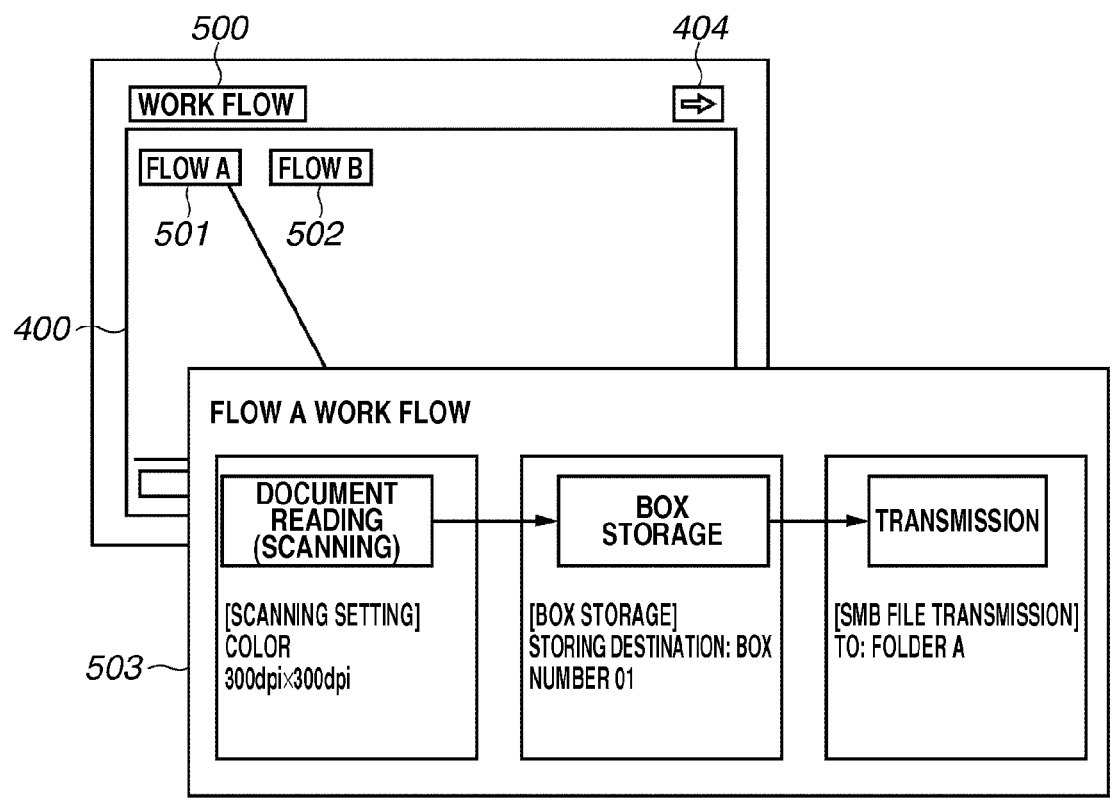
FIG. 5 illustrates an example of an operation screen displayed on the operation unit.

FIG. 5 illustrates an example of an operation screen displayed when the arrow key 404 is pressed in the operation screen of FIG. 4.

FIG. 5 illustrates an example of an operation screen for a work flow function which operates the image processing apparatus 101 according to a work flow 500 defined by the user. In the work flow function, a work flow 500 is created by combining various arbitrary functions installed in the image processing apparatus 101 such as inputting of image data, processing 1 of the input image, processing 2 of the input image, and so on. The work flow 500 is registered in the HDD 204 and the registered work flow can be read and used.

FIG. 5 illustrates a state that two work flows, i.e., a "FLOW A" and a "FLOW B", are registered in the area 400. When the user presses the start key 301 after selecting the "FLOW A" 501, a work flow defined as the "FLOW A" is executed. When the user presses the start key 301 after selecting the "FLOW B" 502, a work flow defined as the "FLOW B" is executed.

As it is illustrated in an area 503 (the area 503 schematically illustrates a content of the work flow, and is not displayed in the initial screen of the work flow function), the "FLOW A" is defined so as to execute "scanning", "box storage", and "transmission" in this order.

Reading setting of the "scanning" is set to execute color reading at reading resolution of 300×300 dpi. When the "box storage" is executed, a box of a box number 01 is set as a storing destination. When the "transmission" is executed, a server message block (SMB) is selected as a transmission protocol, and it is set to transmit to a folder A of a PC which is a SMB transmission destination.

As described above, definition and registration of the work flow enable execution of arbitrary processing by one-touch. The work flow can be created and registered by the operation unit 213, or can be created by the terminal 103 and registered by receiving therefrom. Further, the work flow may be registered in a device such as the terminal 103 on the network 100 in stead of being registered in the HDD 204, and the registered work flow may be obtained by the operation from the operation unit 213 to be used.

Figure 6:
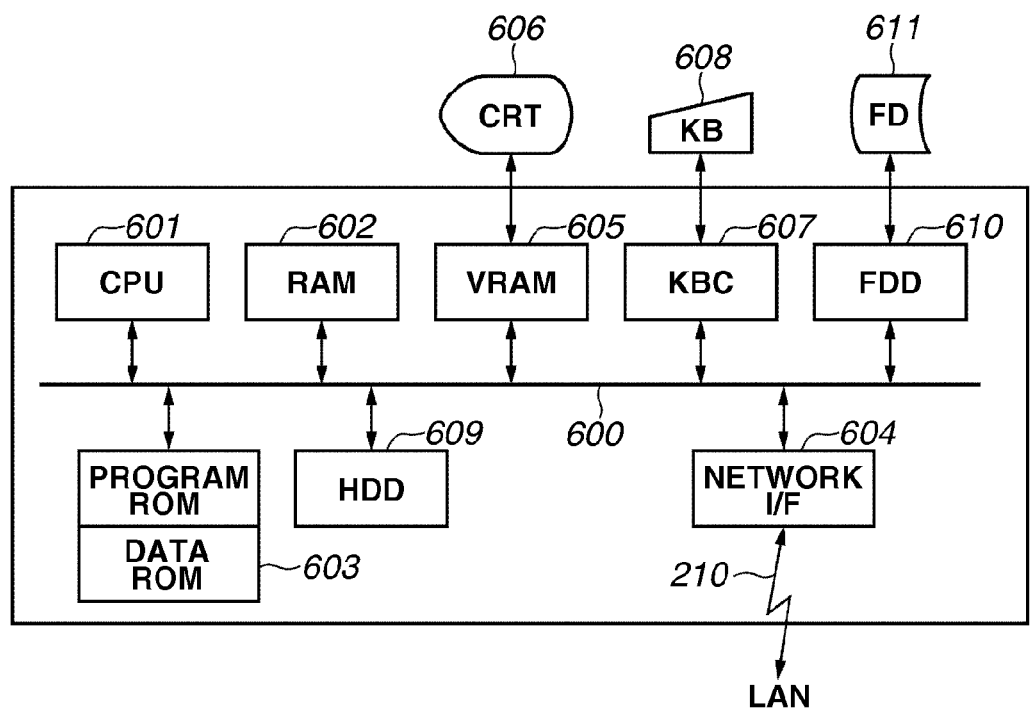
FIG. 6 is a block diagram illustrating an example of a configuration of a terminal and a document management server.

FIG. 6 is a block diagram illustrating an example of a configuration of the terminal 103 and the document management server 102 illustrated in FIG. 1.

In FIG. 6, a central processing unit (CPU) 601 manages calculation and control of the terminal 103 and the document management system 102.

A RAM 602 functions as an execution area and a data area of an execution program as a main memory of the CPU 601.

A ROM 603 stores operation procedures of the CPU 601. The ROM 603 includes a program ROM which stores a system program for controlling the terminal 103 and the document management server 102 and a data ROM which stores information necessary for starting the system. The program controlled by the CPU 601 can be stored in a HDD 609, which will be described below, other than the ROM 603.

A network I/F 604 controls a data transmission between devices via a network and checks a connection condition between the devices.

A video random access memory (VRAM) 605 rasterizes an image to be displayed on a screen of a below described cathode-ray tube (CRT) 606 which displays an operating condition of the terminal 103 and the document management server 102 and controls the display.

The CRT 606 displays various types of information. A display device of another display style such as a liquid crystal display device may be used instead of the CRT.

A key board controller (KBC) 607 controls an input signal from a key board (KB) 608.

The KB 608 is an input device which receives operations of the user. A pointing device such as a mouse may be used as another input device in addition to the KB 608.

The HDD 609 is used for storing an application program or various pieces of data. In the present exemplary embodiment, the application program is a software program which executes various processing of the present exemplary embodiment.

A floppy disk drive (FDD) 610 writes and reads data into and from a detachable floppy disk (FD) 611. The FDD 610 is used to read the application program from a medium. Another removable memory such as a compact disk read-only memory (CD-ROM), a magnetooptical (MO) disk and an external HD may be used instead of the FD 611.

The application program and data to be stored in the HDD 609 may be used by storing in the FD 611.

A transmission bus 600 (an address bus, a data bus, an input/output bus and a control bus) connects among the above described units.

Figure 7:
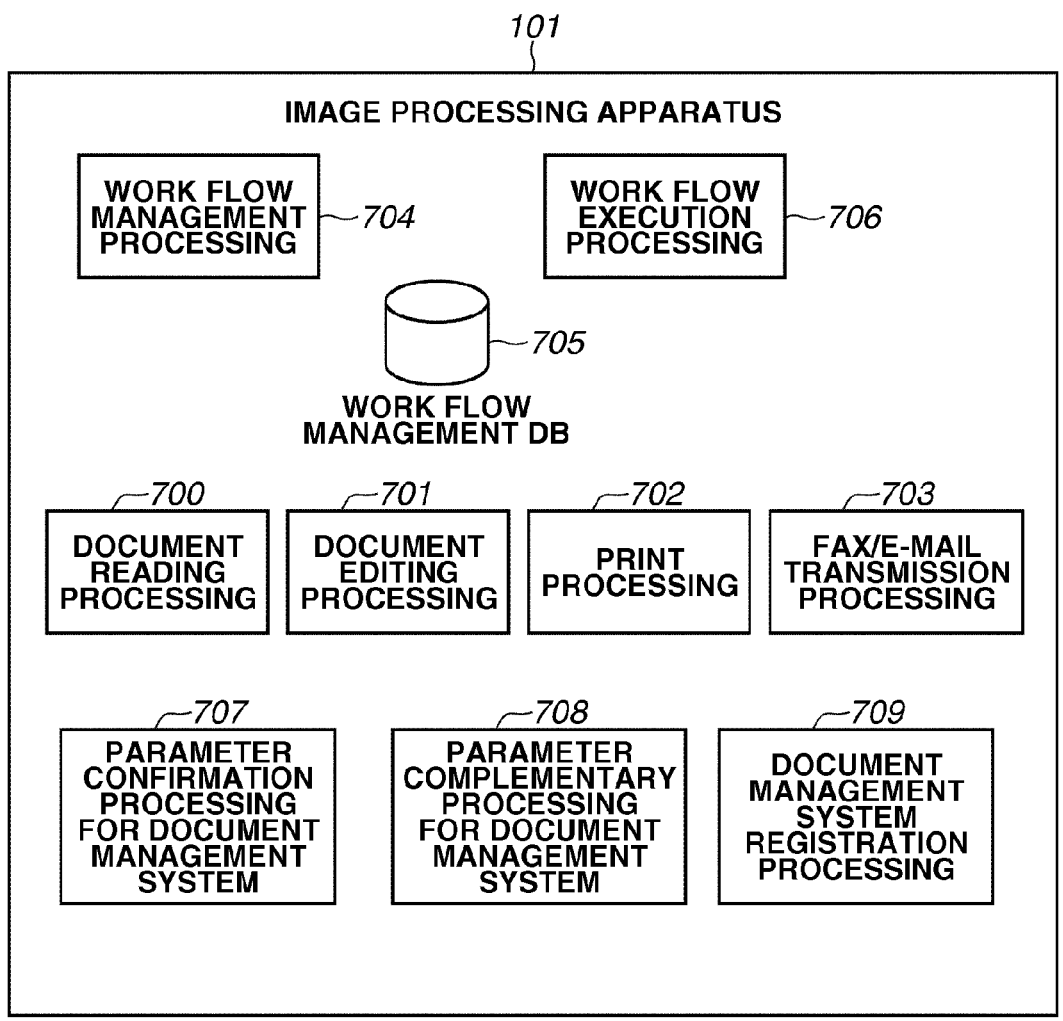
FIG. 7 illustrates a processing group according to the exemplary embodiment.

FIG. 7 illustrates processing groups for realizing the below described processing of the present exemplary embodiment in the image processing apparatus 101. The processing groups in FIG. 7 include programs executed by the image processing apparatus 101 and are stored in the HDD 204 or the ROM 203 of the image processing apparatus 101. Those programs are loaded onto the RAM 202 and executed by the CPU 201. The processing groups can be implemented as an individual program group and also as an program. A work flow management database 705 is constituted in the HDD 204 of the image processing apparatus 101.

In document reading processing 700, an image on a document is read by the scanner 220 and image data representing thus read image is generated. The scanner 220 can read documents such as a paper medium (a sheet-like medium and a book-like medium) and a medium similar to paper. The document placed on a document positioning plate of the scanner 220 by the user can be read. The sheet-like document can be read by conveying a reading position of the scanner 220 sheet by sheet according to an automatic document feeder (ADF) in which one or a plurality of sheets of the sheet-like documents are set.

A document editing processing 701 edits image data acquired by the document reading processing 700 to delete a page or to combine with the other image data. In the document editing processing 701, the image data is stored in a box provided in the HDD 204 via the transmission bus 207.

Print processing 702 causes the printer 221 to print the image data acquired by the document reading processing 700, the image data edited by the document editing processing 701, or data received from the external device as a visible image on recording paper.

FAX/e-mail transmission processing 703 instructs the network I/F 209 or the modem 211 via the transmission bus 207 to transmit the image data acquired by the document reading processing 700 and the image data edited by the document editing processing 701 to a designated destination address. Examples of a communication method to the destination address in the FAX/e-mail transmission processing 703 include a G3 facsimile communication (International Telecommunication Union Telecommunication Standardization Sector (ITU-T) recommendation T.30) and an electronic mail according to a communication protocol such as a simple mail transfer protocol (SMTP).

In a workflow management processing 704, an order of execution of each processing included in the work flow and a preset content of the each processing are registered and managed. In the work flow management processing 704, a work flow input by the user in the operation unit 213 is received via the transmission bus from the operation unit I/F 206. The work flow management processing 704 instructs the HDD 204 via the transmission bus 207 to store the received work flow to an area in the work flow management database 705. Not only the work flow set by the user via the operation unit 213 but also the work flow received from the network such as the LAN 210 via the network I/F 209 may be stored.

The work flow management database (DB) 705 stores the work flow according to an instruction from the work flow management processing 704. Further, the work flow management DB 705 can also transmits the stored work flow to the work flow execution processing 706 via the transmission bus according to an instruction from the work flow execution processing 706.

The work flow execution processing 706 instructs the work flow management DB 705 to transmit the work flow stored therein via the data transmission bus. Then, the transmitted work flow is analyzed by the work flow execution processing 706 and each processing is executed one by one according to the setting of the work flow.

Parameter confirmation processing 707 for the document management system is started when the work flow execution processing 706 executes a work flow which includes "document data registration (transmission) to the document management server 102". The parameter confirmation processing 707 for the document management system confirms whether essential input items necessary for registering the document data into the document management server 102 are set in the content set in the work flow. The essential input items may be acquired from the document management server 102 by the image processing apparatus 101. Alternatively, the essential input items may be preliminary registered in the image processing apparatus 101.

Parameter complementary processing 708 for the document management system is started when the work flow execution processing 706 executes the work flow which includes "document data registration (transmission) to the document management server 102". In the parameter complementary processing 708 for the document management system, values of the essential input items which are not included in the content set in the work flow (unset essential items) are complemented and added to the setting corresponding to the processing in the running work flow.

Figure 8:
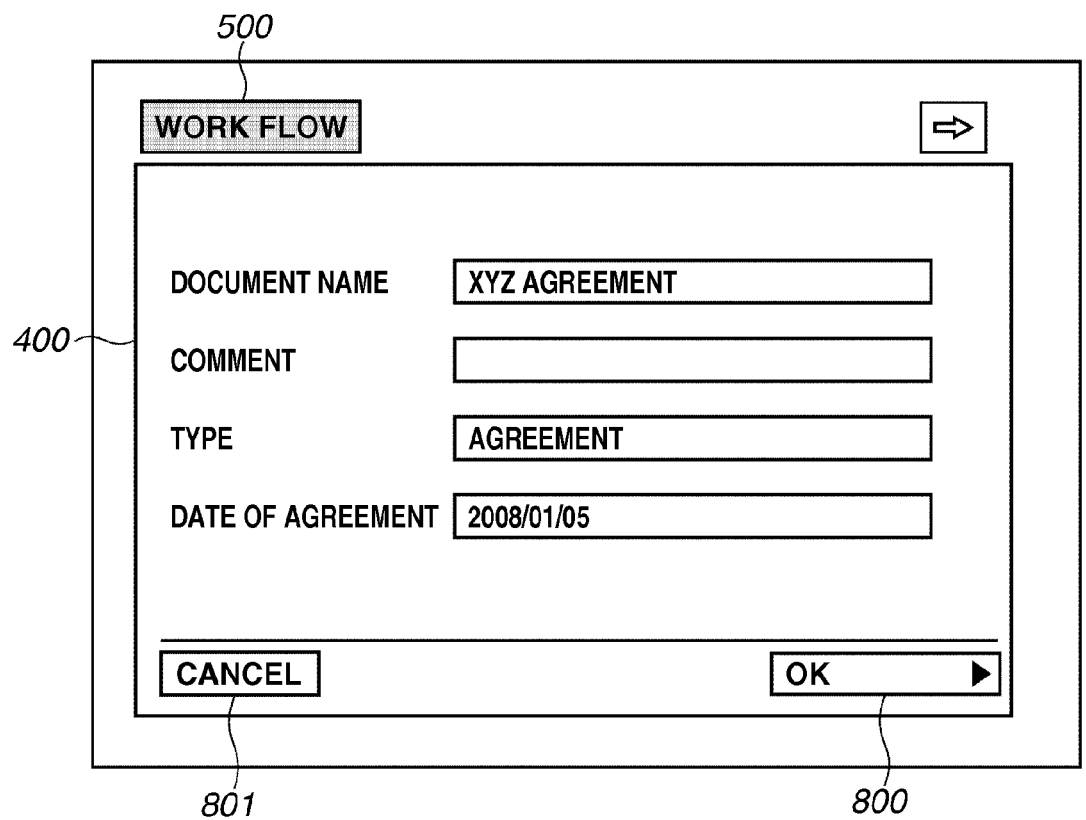
FIG. 8 illustrates an example of an operation screen displayed on the operation unit.

When the values of the unset essential items are complemented by the parameter complementary processing 708 for the document management system, the operation unit OF 206 is instructed to display on the operation unit 213 a graphical user interface (GUI) as illustrated in FIG. 8. In this case, upon execution of the work flow 500, the unset essential items are notified to the user by the GUI of FIG. 8 so as to cause the user to input the values of the unset essential items.

When the work flow is executed, the essential input items are confirmed by the parameter confirmation processing 707 for the document management system. If any of the essential input items is left blank, items to be input such as "DOCUMENT NAME", "COMMENT", "TYPE" and "DATE OF AGREEMENT" are displayed in the area 400 as illustrated in FIG. 8.

FIG. 8 illustrates a state that a value of "XYZ agreement" is input into "DOCUMENT NAME". Also, "AGREEMENT" is input into "TYPE" and "2008/01/05" is input in "DATE OF AGREEMENT". On the other hand, nothing is input in "COMMENT". The user can input a value for each of the unset essential items by operating the operation unit 213.

After the values are input, if the user presses a OK button 800, the operation unit 213 transfers the values for the unset essential items input by the user to the parameter complementary processing 708 for the document management system via the operation unit I/F 206 and the transmission bus 207. Upon receiving the values for the unset essential items input by the user, the complementary processing 708 for the document management system adds the values for the unset essential items to processing setting of a corresponding work item of the running work flow.

When the user presses a cancel button 801, the operation unit 213 notifies the parameter complementary processing 708 for the document management system of cancel of the processing via the operation unit I/F 206 and the transmission bus 207. When the notification of cancel is received, the parameter complementary processing 708 for the document management system ends the processing. In the present exemplary embodiment, it is possible to transmit the image data to the document management server 102 even with the unset items.

Items such as "DOCUMENT NAME", "COMMENT", "TYPE", and "DATE OF AGREEMENT" illustrated in the area 400 in FIG. 8 are mere examples. Other items and item names may be used according to a specification of the document management server 102, a type of the document to be registered, and so on. These input items can be used as index information for searching and classifying the documents by the document management server 102.

The parameter complementary processing 708 for the document management system may automatically complement values for the unset essential items. In other words, the values can be automatically complemented without displaying the user interface illustrated in FIG. 8 or when the user did not input or cancelled the values for the unset essential items even if the user interface has been displayed.

For example, an executed work flow name, a user name who executed the work flow, a date of execution of the work flow, a character string set as a default value, or a combination thereof may be used as a value for complementing character string data such as "DOCUMENT NAME" in FIG. 8. Alternatively, the character string or the like included in scanned document data is recognized and acquired as characters to complement the values. Date data such as "DATE OF AGREEMENT" may be complemented with a value of the execution date of the work flow or a preliminary set date. Whether to perform such an automatic complement or not may be preliminary set in the RAM 203.

Document management system registration processing 709 is started when a work flow which includes "document data registration (transmission) to the document management server 102" is executed by the work flow execution processing 706. The document management system registration processing 709 refers to the content set in the running work flow and the values added by the parameter complementary processing 708 for the document management system and transmits the image data to the document management server 102 as document data.

At the time, if the unset essential item is found in the content set in the work flow by referring to the processing result of the parameter confirmation processing 707 for the document management system, the document management system registration processing 709 instructs the document management server 102 to register the transmitted document data in a check-out condition. If no unset essential item is found in the content set in the work flow, the document management system registration processing 709 instructs the document management server 102 to register the transmitted document data in a check-in condition.

In the check-out condition, the document data stored in the HDD 609 of the document management server 102 is locked so as not to allow the other user to edit the document data before the user who instructed the registration of the document data checks in. More specifically, in the check-out condition, the registration is not formally completed in the document management server 102 but is under the condition of temporary registration. In the check-out condition, the user can complement a blanked input item for the document data by using the terminal 103.

In the check-in condition, the data itself, a property and version information of the document data in the check-out condition are committed so that the other users can refer to and edit the data. More specifically, a formal registration of the document data is completed in the document management server 102.

Figure 9:
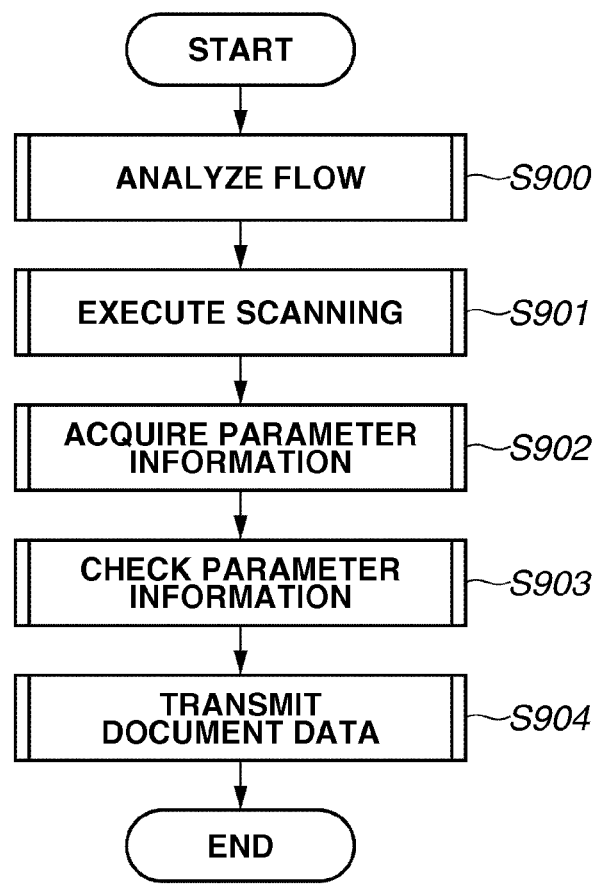
FIG. 9 is a flow chart illustrating processing according to the exemplary embodiment.

FIG. 9 is a flow chart illustrating processing for registering image data which is acquired by reading an image on a document by the scanner 220 according to a designated work flow in the image processing apparatus 101 as document data in the document management server 102. The flowchart illustrates the processing which is controlled by rasterizing the program stored in the ROM 203 and the HDD 204 on the RAM 202 and executing the program by the CPU 201. In FIG. 9, the flow is an example when a scan is executed to acquire image data, but the image data may be acquired from the box in which the image data is stored.

In step S900, the user presses a button corresponding to an arbitrary work flow in the operation screen of FIG. 5 in the operation unit 213. Accordingly, the content set in the work flow designated by the user is analyzed in the work flow execution processing 706.

In step S901, the work flow execution processing 706 causes the scanner 220 to read (scan) an image on a document according to a scan setting which is acquired as a result of the analysis in step S900.

In step S902, the work flow execution processing 706 starts the parameter confirmation processing 707 for the document management system to perform the processing. The parameter confirmation processing 707 for the document management system makes a query about the essential input items necessary for registering the document data into the document management server 102.

Examples of the essential input items include various items such as items common to all pieces of the document data to be registered in the document management server 102, items unique to registration into a specific folder, items specified according to the work flow, and items specified according to a content of a document to be scanned. When the essential input items are preliminary stored in the RAM 202 or the HDD 204 of the image processing apparatus 101, the RAM 202 or the HDD 204 will be referred to instead of making the query to the document management server 102.

In step S903, the query result, the input item included in the content set in the work flow, and the item input by the operation unit 213 are compared to each other in the parameter confirmation processing 707 for the document management system. Based on the comparison result, it is determined whether the essential input items necessary for registering the document data into the document management server 102.

In step S904, the work flow execution processing 706 starts the parameter complementary processing 708 for the document management system to perform the processing. According to the parameter complementary processing 708 for the document management system, the values of the unset essential items in the content set in the work flow are complemented if they are set so as to be automatically complemented. Then, the values are added to the processing setting of the corresponding work items of the running work flow. If it is not set so as to be automatically complemented, the screen of FIG. 8 is displayed to prompt the user to complement the values. If the user complements the values, the values are added to the processing setting, whereas, if the user did not complement the values, no change is made.

Then the work flow execution processing 706, starts the document management system registration processing 709 to perform the processing. According to the document management system registration processing 709, the image data acquired in step S901 is transmitted to the document management server 102 together with the content preliminary set in the work flow and values added to the work flow in the parameter complementary processing 708 for the document management system. The document management server 102 registers thus received image data in the form of the document data together with the parameter received at the same time. However, if there is a parameter to be filled up, the document management server 102 registers (temporarily registers) the image data such that the image data is identifiable as defective data.

Figure 10:
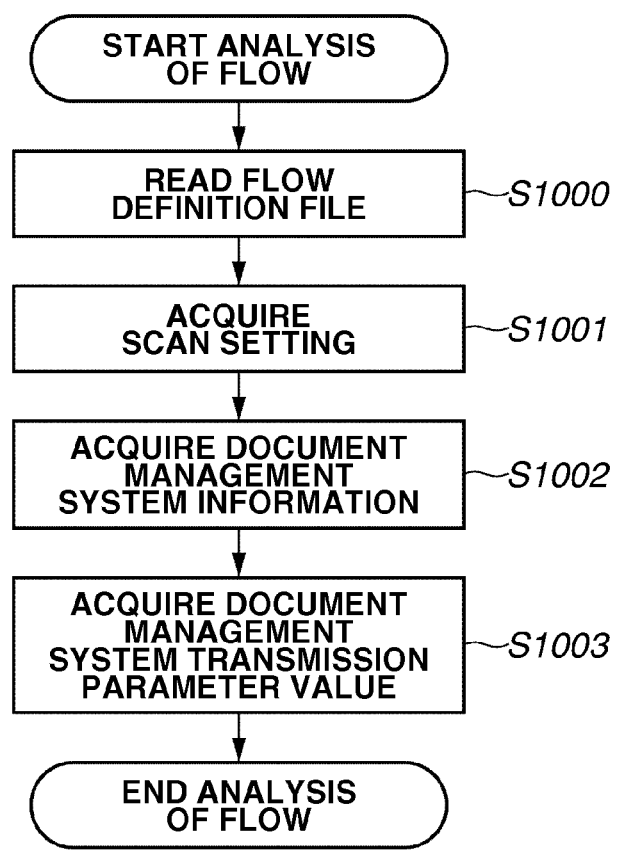
FIG. 10 is a flow chart illustrating step S900 of FIG. 9 in detail.

FIG. 10 is a flow chart illustrating processing of step S900 of FIG. 9 in detail.

In step S1000, the work flow execution processing 706 acquires the work flow designated by the user via the operation unit 213 from the work flow management DB 705.

In step S1001, the work flow execution processing 706 refers to the work flow acquired in step S1000 and acquires scan setting information to send an instruction to the scanner 220. The scan setting information includes information about a reading mode (color/monochrome), a number of gradation bits, a read-out density, read-out resolution, a file format of the image data after reading, and the like.

In step S1002, the work flow execution processing 706 refers to the content of the work flow acquired in step S1000 and acquires document management system information about the document management server 102 in which the image data is transmitted as the document data. The document management system information includes address information such as a uniform resource locator (URL) and an internet protocol (IP) address of the document management server 102 which are necessary for accessing the document management server 102.

In step S1003, the work flow execution processing 706 refers to the content of the work flow acquired in step S1000 and acquires document management system transmission parameter information which is a parameter value necessary for formal registration of the document data into the document management server 102. The document management system transmission parameter information includes essential input items such as a document name as of the registration of the document data, an index value for a search which is necessary for the formal registration on the document management server 102, a property value associated with the document data, and the like.

Figure 11:
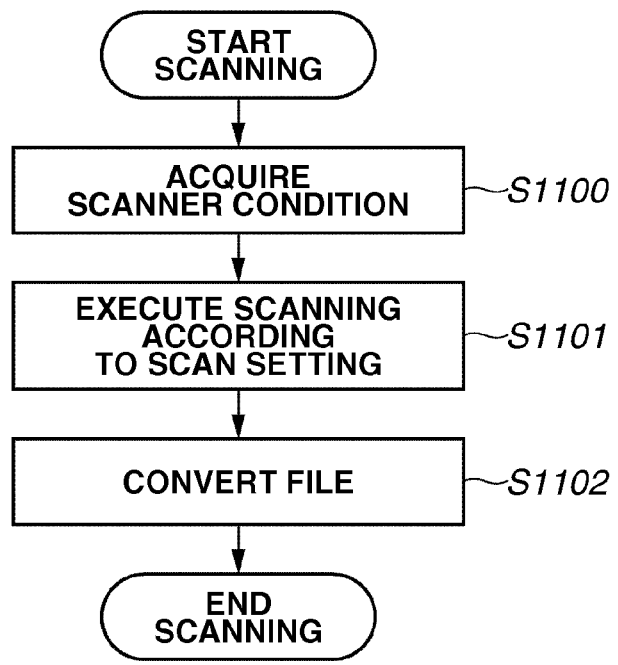
FIG. 11 is a flow chart illustrating step S901 of FIG. 9 in detail.

FIG. 11 is a flow chart illustrating processing of step S901 of FIG. 9 in detail.

In step S1100, the work flow execution processing 706 instructs the scanner 220 to notify it of a scanner condition via the transmission bus 207, the image bus I/F 205, the image bus 208, and the device I/F 215. The scanner condition includes a function and a present status of the scanner. For example, when an ADF is installed in the scanner as a function, the scanner condition includes information about the ADF and information whether the ADF can perform two-sided reading. Further, the scanner condition may include information about other functions, such as whether the multicolor reading is possible (a reading mode), a document size, resolution, a range of density, gradation information, and a file format which the scanner can handle, and the like. The status of the scanner includes information about whether the scanner is now on available, and the like.

In step S1101, the work flow execution processing 706 instructs the scanner 220 about the reading mode, the number of gradation bits, the reading density and the resolution according to the scan setting information acquired in step S1001. Upon receiving the instruction, the scanner 220 scans the document according to the designated settings.

In step S1102, the work flow execution processing 706, converts the image data acquired by reading the image on the document in step S1101 into the file format included in the scan setting information acquired in step S1001. Then, the image file acquired by the conversion is temporarily stored in the HDD 204 according to the work flow execution processing 706.

Figure 12:
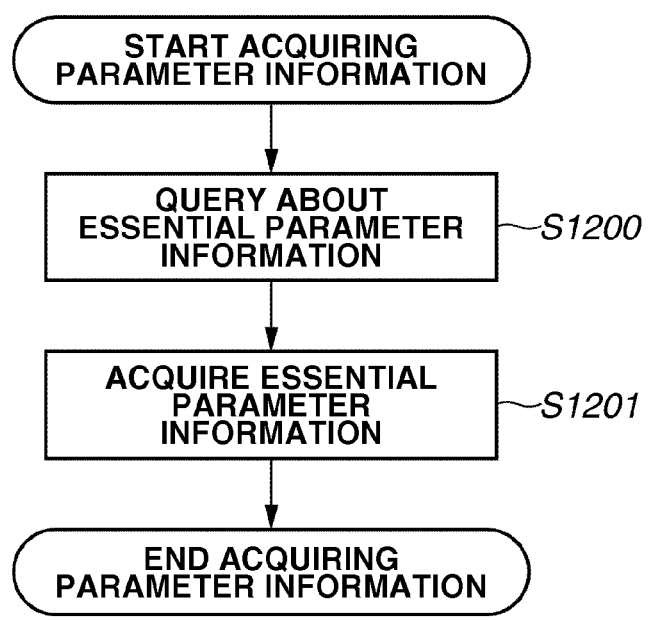
FIG. 12 is a flow chart illustrating step S902 of FIG. 9 in detail.

FIG. 12 is a flow chart illustrating processing of step S902 of FIG. 9 in detail.

In step S1200, the work flow execution processing 706 starts the parameter confirmation processing 707 for the document management system. The parameter confirmation processing 707 for the document management system refers to the address information which is included in the document management system information for specifying the document management server 102 acquired in step S1002. Then, the parameter confirmation processing 707 for the document management system, sends a query to the document management server 102 about the essential input items necessary for registering the document data according to the acquired address information.

In step S1201, the parameter confirmation processing 707 for the document management system receives a response for the query sent in step S1200 via the network I/F 209 and the transmission bus 207. Then, the parameter confirmation processing 707 for the document management system temporarily stores the essential input item information necessary for registering the document data which is included in thus received response in the HDD 204 or the RAM 602.

Figure 13:
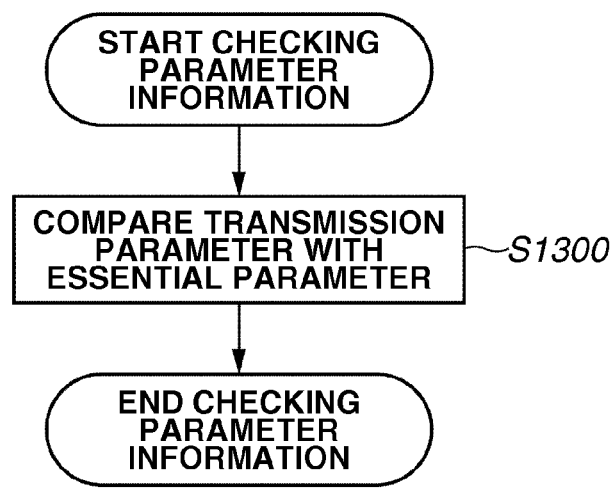
FIG. 13 is a flow chart illustrating step S903 of FIG. 9 in detail.

FIG. 13 is a flow chart illustrating processing of step S903 of FIG. 9 in detail.

In step S1300, in the parameter confirmation processing 707 for the document management system, the document management system transmission parameter information acquired in step S1003 is compared with the essential input item information necessary for registering the document data acquired in step S1201. As a result of the comparison, the essential input item information that is not included in the document management system transmission parameter information is associated with target image data or a target work flow as unset essential input item information and temporarily stored in the HDD 204 or the RAM 602.

Figure 14:
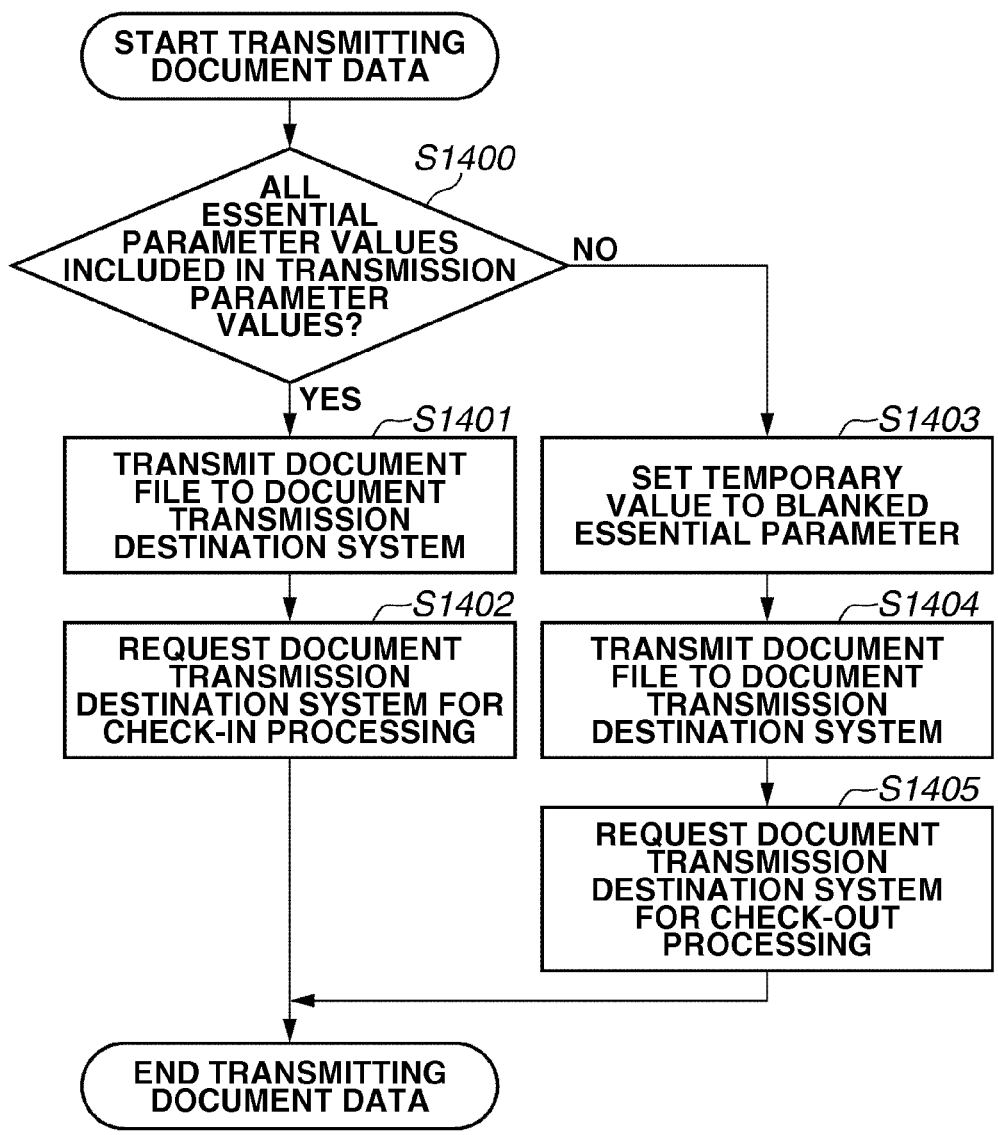
FIG. 14 is a flowchart illustrating step S904 of FIG. 9 in detail.

FIG. 14 is a flow chart illustrating processing of step S904 of FIG. 9 in detail.

In step S1400, the work flow execution processing 706 checks whether there is the unset essential input item acquired in step S1300. If there is no unset essential input item (YES in step S1400), it is determined that the content set for the work flow includes all the essential input item information necessary for registering the document data into the document management server 102, and the processing proceeds to step S1401. If there is the unset essential input item (NO in step S1400), it is determined that the content set for the work flow includes blanked essential input item information necessary for registering the document data into the document management server 102, and the processing proceeds to step S1403.

In step S1401, the work flow execution processing 706 starts the document management system registration processing 709. The document management system registration processing 709 transmits the document data (the image data acquired in step S901) to the document management server 102 based on the document management system information acquired in step S1002 according to the content set in the running work flow. At the time, the document management system information acquired in step S1002 is referred to for the address information of the document management server 102. Thus acquired document management system transmission parameter value is used to transmit the imaged data as the document data.

In step S1402, the document management system registration processing 709 transmits a request to the document management server 102 via the transmission bus 207 and the network I/F 209 for check-in of the transmitted document data.

In step S1403, the work flow execution processing 706 starts the parameter complementary processing 708 for the document management system. The parameter complementary processing 708 for the document management system refers to the unset essential input item information acquired in step S1300 to complement the unset essential input items. Thus complemented values are added to the processing setting of the corresponding work item of the running work flow.

The parameter complementary processing 708 for the document management system may display the GUI illustrated in FIGS. 7 and 8 when values are complemented to the unset essential input items. Alternatively, the values may be automatically complemented to the unset essential input items. For example, when "DOCUMENT NAME" is the unset essential input item, a file name may be created and provided automatically based on a date of registration, ID of the work flow, a reception number of a job such as scanning, and the like. The file name is used for discriminating the document data which is stored in the document management server 102. The file name includes a prefix to be used for storing the document data in a directory format and an extension representing a type of the file.

Complementary processing for the unset essential input items may be omitted here. However, if there is an essential input item which is left blank, registration may not be accepted depending on the document management server 102. In this case, the complementary processing must be performed. Consequently, if the complementary processing has not been performed, the essential input item is complemented by dummy data or the processing is stopped by inhibiting the transmission of the data to the document management server 102. The above processing may be selected, as required, according to a specification or settings of the document management server 102.

In step S1404, the work flow execution processing 706 starts the document management system registration processing 709. In the document management system registration processing 709, the document data is transmitted to the document management server 102 which is specified with the document management system information acquired in step S1002.

At the time, the document management system information acquired in step S1002 is referred to for the address information of the document management server 102. For the acquired document management system transmission parameter value or the like, it is accorded to the content set in the running work flow and the value (complimentary value) corresponding to the unset essential input item added to the processing setting of the work item in step S1403. Further, for the document data to be transmitted, the image data acquired in step S1102 is transmitted as the document data.

At the time, the document management system registration processing 709 transmits the document data, the transmission parameter, and the like to the document management server 102 via the transmission bus 207 and the network I/F 209.

In step S1405, the document management system registration processing 709 transmits a request to the document management server 102 via the transmission bus 207 and the network I/F 209 for check-out of the transmitted document data.

At the time, the document management system registration processing 709 may transmit the check-out request so as to designate a version number as "0" to make the next check-in an initial version (i.e., version number "1"). As described above, if the version number 0 is assigned, when the unset input item which includes a blank or dummy data is complemented in the terminal 103, the unset input item can be registered as a formal item with the version number 1. The version number may be selected, as required, according to the specification or the settings of the document management server 102.

At the time, the user who registered the document data (the user who started the work flow) can be specified. For example, the user who registered the document data can be specified in cases where user authentication is performed in the image processing apparatus 101 and where user information is included in the content set in the work flow.

In the above described cases, only the specified user is allowed to edit the document data in the check-out condition. Therefore, the document data is transmitted to the document management server 102 to be stored therein. However, since there is the essential input item which is left blank, it is possible to create a situation that other users are not allowed to refer to or edit the document data.

The document management server 102 may notify the user of a message indicating presence of the document data in the check-out condition and prompt the user to complement the unset input item when the user accesses (logs in) the document management server 102 via the terminal 103.

Since user information is included in the content set in the work flow, there is a case where the document management system registration processing 709 can specify an address such as an electronic mail address corresponding to the user information. In this case, a mail including information for specifying the check-out document data (e.g., a URL or a folder pass) or information indicating that the document data is in the check-out condition may be transmitted via the network I/F 209. Accordingly, the user can complement the blanked item using the terminal 103 to shift the document data to the check-in condition.

As described above, according to the present exemplary embodiment, it is determined whether the input items necessary for the registration of the document are input. Further, based on the determination result, a method for registering the document data to the document management server is controlled to differentiate when the input items necessary for the registration of the document is input and when the input items necessary for the registration of the document is not input. In other words, the document data is formally registered when the input items necessary for the registration of the document are input, and the document data is registered as temporary registration when the input items necessary for the registration of the document are not input.

Therefore, the transmission to the document management server 102 can be performed even when values for the essential input items required by the document management server 102 are not included in the processing setting of the work flow. Accordingly, when the values for the essential input items required by the document management server 102 are not included, a workload of the user caused by troublesome tasks such as a re-execution of the scanning processing and re-entry of the input parameter on the image processing apparatus 101 can be reduced.

In the above described exemplary embodiment, the data to be transmitted to the document management server 102 is exemplified as an image data acquired by reading the document by the scanner 220. However, the data is not limited to the above, and other pieces of data, such as the data stored in the HDD 204 and the data received from an external device, may be transmitted to the document management server 102.

Further, the same effect as the one described above can be obtained even if all the processing group as illustrated in FIG. 7 are not executed by the image processing apparatus 101. More specifically, the document data is transmitted to the document management server 102 without checking the unset essential input items in the image processing apparatus 101, and processing corresponding to the parameter confirmation processing 707 for the document management system is performed by the document management server 102 which received the document data.

In this case, if the document management server 102 determines that there is the unset essential input items, the document management server 102 registers (temporarily registers) the received document data in the check-out condition and in a manner that can be discriminated that the document data includes the unset essential input item. Then, an electronic mail will be sent, as required, to notify the user of the above circumstance. On the other hands, if the document management server 102 determines that the document data satisfactory includes all of the essential input items, the document management server 102 registers the document data in the check-in condition.

In the above described exemplary embodiment, the processing is performed according to the work flow registered in the image processing apparatus 101. However, the processing may be performed without using the work flow. All of the processing may be performed by user's instructions input from the operation unit 213 to transmit the document data to the document management server 102.

In the above described first exemplary embodiment, it is described an example that the image processing apparatus 101 transmits and registers the document data to the document management server 102 according to the work flow registered in the image processing apparatus 101 or the instruction from the operation unit 213.

In a second exemplary embodiment, an example in which similar processing is performed in the other system configuration is described.

Figure 15:
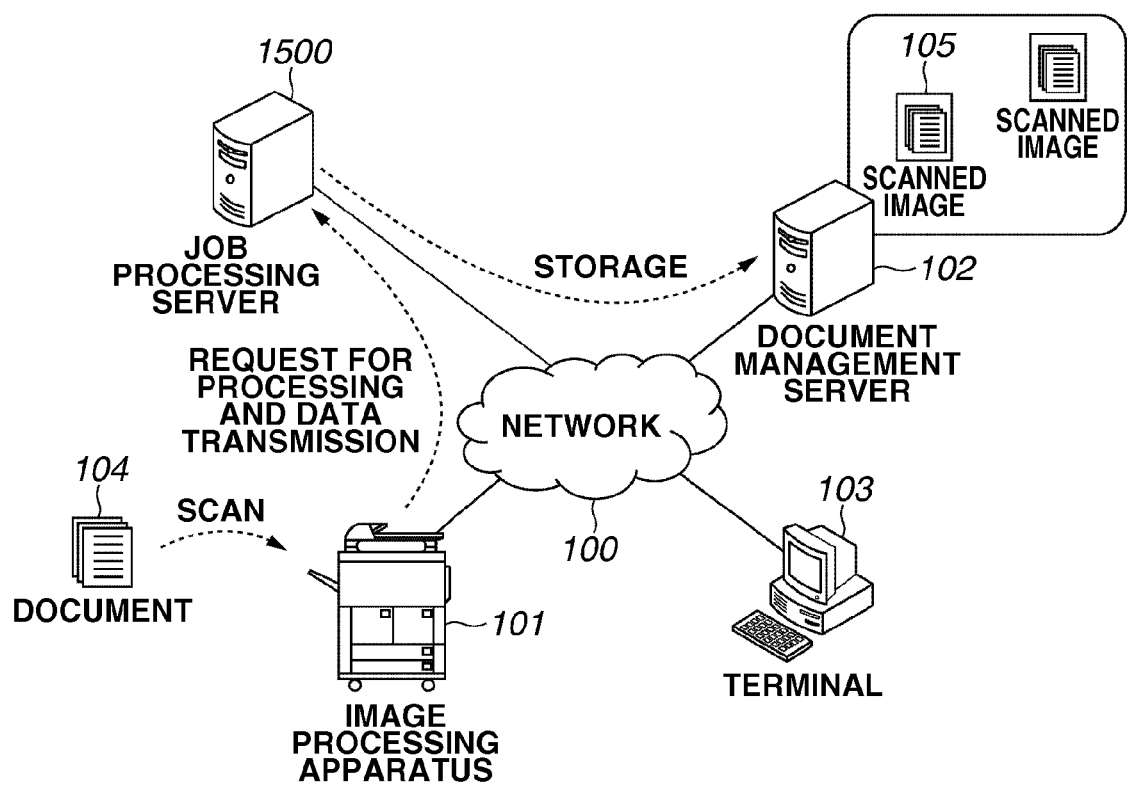
FIG. 15 illustrates a document management system according to a second exemplary embodiment.

FIG. 15 illustrates a document management system according to the second exemplary embodiment. In FIG. 15, the elements other than a job processing server 1500 are the same as those illustrated in FIG. 1, and thus of which descriptions are omitted below.

The job processing server 1500 can be realized with the configuration as illustrated in FIG. 6.

The job processing server 1500 has a function of receiving image data from the image processing apparatus 101 and registering the image data into the document management server 102 as document data. Further, the job processing server 1500 can store a plurality of job tickets, each of which defines a content of a job for executing the image processing apparatus 101, in the HDD 609. Then, the job processing server 1500 can transmit the job ticket in response to a request from the image processing apparatus 101, and causes the image processing apparatus 101 to execute the job. The job ticket can be created by directly operating the job processing server 1500. Also, the job ticket created by the terminal 103 can be received via the network 100 and stored in the job processing server 1500.

Further, the job processing server 1500 has an image processing function for image data such as optical character recognition (OCR) processing, extracting a text, and dividing a page. The job processing server 1500 performs processing in response to a request from an apparatus, e.g., the terminal 103 or the image processing apparatus 101, which could be a client. The job processing server 1500 does not need to perform all the above described processing by one apparatus. For example, one of the job processing servers may manage the job tickets while the other one of the job processing servers may perform processing of the image data received from the image processing apparatus 101.

The job processing server 1500 performs processing, for example, in a manner as described below. The job processing server 1500 acquires image data generated by scanning a document in a paper medium in the image processing apparatus 101. Then, the image data acquired from the image processing apparatus 101 is subjected to processing such as OCR processing and form combining processing for creating a transmittal form or the like in the job processing server 1500. Subsequently, the resulting image data is transmitted to the document management server 102 from the job processing system 1500 to be stored and managed as the image data.

In the above described case, registration of the document data into the document management server 102 may fail if the essential input items are not set. In this case, the user has to handle tasks of re-execution of the input of the image data, i.e., scanning, and re-entry of the input parameter, which increases a load of the user. Further, a problem that a failure of the registration in the document management server 102 is hardly found may occur since the user does not directly operate the job processing server 1500. A creator of the job ticket may not notice a mismatch in the input item essential for the registration of the document data into the document management server 102 and such event may often occur. The above problem may often occur when a single job ticket is used for various jobs.

To resolve the above problem, in the present exemplary embodiment, processing corresponding to a part of the processing group of FIG. 7 is executed by the job processing server 1500 to prevent the above described drawback from occurring in the system of FIG. 15.

In other words, in the second exemplary embodiment, the parameter confirmation processing 707 for the document management system, the parameter complementary processing 708 for the document management system, and the document management system registration processing 709 are also executed in the job processing server 1500. Processing of the job processing system 1500 will be described below. In the job processing server 1500, the program stored in the ROM 603 or HDD 609 is loaded onto the RAM 602 to be executed by the CPU 601, so that each processing is executed.

Initially, in the image processing apparatus 101, a job ticket stored in the job processing server 1500 is acquired by an operation of the user via the operation unit 213. More specifically, the job processing server 1500 is requested for a list of job tickets and the list is displayed on the operation unit 213. Then, a desirable job ticket is selected from the list and acquired via the network I/F 210 to store in the image processing apparatus 101.

The image processing apparatus 101 reads the image data on the document by the scanner 220 and inputs the input items according to the content of the acquired job ticket in the same manner as it is performed in the first exemplary embodiment.

Subsequently, in the present exemplary embodiment, the image processing apparatus 101 transmits the acquired image data to the job processing server 1500 via the network I/F 209 together with the job ticket. In the second exemplary embodiment, the work flow of the first exemplary embodiment is to be interpreted as the job ticket.

Then, the job processing server 1500 which received the image data and the job ticket executes processing of the steps S902 through S904 of FIG. 9.

At the time, the job processing server 1500 executes image processing according to the content set in the job ticket. The job processing server 1500, then, determines presence or absence of the unset essential input item based on the unset essential input item information.

The job processing server 1500 executes steps S1401 and S1402 in FIG. 14 of the first exemplary embodiment when the job processing server 1500 determines according to the content of the job ticket that there is no unset essential input item.

Further, the job processing server 1500 executes steps S1404 and S1405 in FIG. 14 of the first exemplary embodiment according to the content of the job ticket when the job processing server 1500 determines that there is the unset essential input item.

As described above, according to the second exemplary embodiment, the workload of the user can be reduced, similar to the first exemplary embodiment, even if the image data is transmitted from the image processing apparatus 101 to the document management server 102 via the job processing server 1500 as it is illustrated in FIG. 15. Further, the document data can be transmitted to the document management server 102 even if the essential input item is not set. In other words, the user is less required to be conscious about the failure of the document transmission in the job processing server 1500.

In the above described exemplary embodiment, the document data to be registered in the document management server 102 is exemplified such that the document data is input from the image processing apparatus 101. However, any type of the document processing apparatus can be used as far as the apparatus can input the document data which can be managed by the document management server 102. For example, the document data may be various types of data which are edited by the predetermined application software by the terminal 103 or the like.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-281866, filed Oct. 31, 2008, which is hereby incorporated by reference herein in its entirety.

What is claimed is:

1. A document processing apparatus which registers document data in a document management server, the document processing apparatus comprising:
a generating unit configured to generate the document data;
an acquiring unit configured to acquire information about an input item necessary for registration of the document data into the document management server;
a determination unit configured to determine whether the document data is to be registered or temporarily registered into the document management server by determining whether the value for the input item necessary for the registration of the document data is input; and
a control unit configured to perform control to transmit the document data with the value of the input item to the document management server and to request the document management server to complete the registration of the document data into the document management server when the determination unit determines that the document data is to be registered into the document management server, and to transmit the document data to the document management server and to request the document management server to temporarily register the document data into the document management server when the determination unit determines that the document data is to be temporarily registered into the document management server.

2. The document processing apparatus according to claim 1, further comprising a notification unit configured to notify a user of the determination result of the determination unit.

3. The document processing apparatus according to claim 1, further comprising a storage unit configured to store a work flow or a job ticket, wherein the control unit transmits the document data to the document management server.

4. The document processing apparatus according to claim 3, wherein the generating unit comprises a reading unit configured to read an image on a document and generate document data representing the image.

5. The document processing apparatus according to claim 1, wherein the acquiring unit acquires the information from the document management server.

6. The document processing apparatus according to claim 1, wherein the temporarily registered document data is a registered into the document management server in a state where only a user having requested the registration can edit the temporarily registered document data.

7. The document processing apparatus according to claim 1, wherein the registered document data is registered into the document management server in a state where a user not having requested the registration can edit the completely registered document data.

8. The document processing apparatus according to claim 1, further comprising a complement unit configured to automatically input the value for the input item in a case where it is determined that a value for the input item is not input.

9. The document processing apparatus according to claim 1, further comprising a display unit configured to display an operation screen for receiving input of the value for the input item in a case where it is determined that a value for the input item is not input.

10. The document processing apparatus according to claim 1, wherein the document data is registered in a check-in condition in a case where the registration of the document data into the document management server has completed.

11. The document processing apparatus according to claim 1, wherein the document data temporarily registered into the document management server is registered in a check-out condition.

12. A document management system including a document processing apparatus and a document management server, the document processing apparatus comprising:
a generating unit configured to generate document data;
an acquiring unit configured to acquire information about an input item necessary for registration of the document data into the document management server;
a determination unit configured to determine whether the document data is to be registered or to be registered temporarily into the document management server by determining whether the value for the input item necessary for the registration of the document is input; and
a control unit configured to perform control to transmit the document data with the value for the input item to the document management server and to request the document management server to complete the registration of the document data into the document management server when the determination unit determines that the document data is to be registered into the document management server, and to transmit the document data to the document management server and to request the document management server to temporarily register the document data into the document management server when the determination unit determines that the document data is to be temporarily registered into the document management server.

13. The document management system according to claim 12, further comprising a job processing server which includes:
a receiving unit configured to receive the document data input by the document processing apparatus; and a registration unit configured to register the document data received by the receiving unit into the document management server.

14. The document management system according to claim 13, wherein the document processing apparatus comprises:
a reception unit configured to receive a job ticket;
an input unit configured to input the document data based on the job ticket received by the reception unit; and
a transmission unit configured to transmit the document data input by the input unit and the job ticket to the job processing server.

15. The document management system according to claim 12, wherein the acquiring unit acquires the information from the document management server.

16. A method for controlling a document processing apparatus which registers document data in a document management server, the method comprising:
generating the document data;
acquiring information about an input item necessary for registration of the document data into the document management server;
determining whether the document data is to be registered or to be temporarily registered into the document management server by determining whether the value for the input item necessary for the registration of the document data is input; and
performing control to transmit the document data with the value for the input item to the document management server and to request the document management server to complete the registration of the document data into the document management server when it is determined that the document data is to be registered into the document management server, and to transmit the document data to the document management server and to request the document management server to temporarily register the document data into the document management server when it is determined that the document data is to be temporarily registered into the document management server.

17. The method according to claim 16, wherein the information is acquired from the document management server.

18. A method for processing data in a document management system which comprises a document processing apparatus and a document management server, the method comprising:
at the document processing apparatus,
generating document data;
acquiring information about an input item necessary for registration of the document data into the document management server;
determining whether the document data is to be registered or to be temporarily registered into the document management server by determining whether the value for the input item necessary for the registration of the document data is input; and
performing control to transmit the document data with the value for the input item to the document management server and to request the document management server to complete the registration of the document data into the document management server when it is determined that the document data is to be registered into the document management server, and to transmit the document data to the document management server and to request the document management server to temporarily register the document data into the document management server when it is determined that the document data is to be temporarily registered into the document management server.

19. The method according to claim 18, wherein the information is acquired from the document management server.

20. A non-transitory computer readable storage medium storing a program for causing a computer to execute the method defined by claim 17.

21. A non-transitory computer readable storage medium storing a program for causing a computer to execute the method defined by claim 19.

* * * * *